April 14, 1931.  K. TESSKY  1,800,879
FRICTION CLUTCH
Filed April 16, 1928
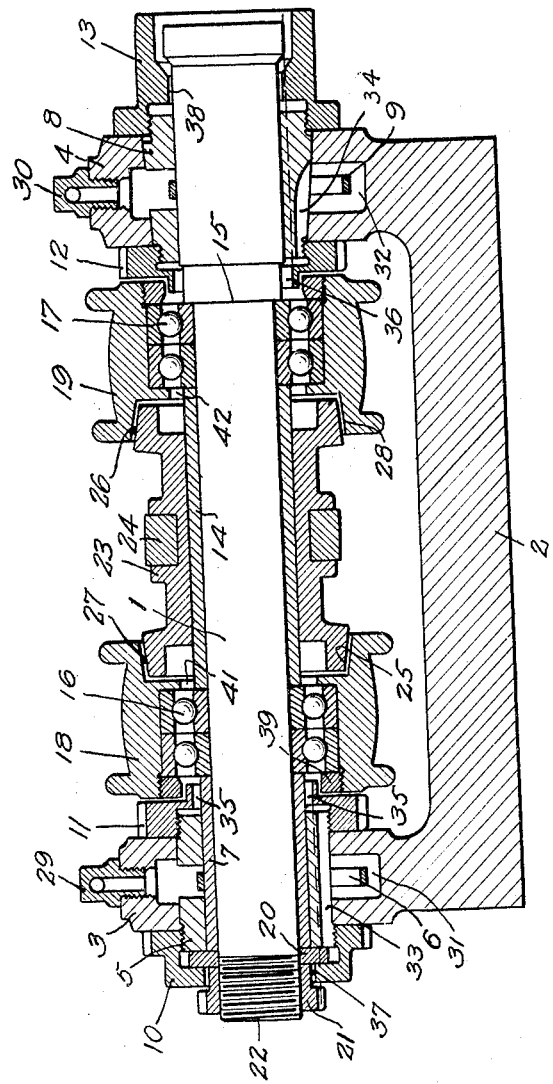
Inventor:
Karl Tessky
by Kinlain
Atty.

Patented Apr. 14, 1931

1,800,879

UNITED STATES PATENT OFFICE

KARL TESSKY, OF ESSLINGEN-ON-THE-NECKAR, GERMANY

FRICTION CLUTCH

Application filed April 16, 1928, Serial No. 270,431, and in Germany April 25, 1927.

My invention relates to friction clutches, and it is an object of the invention to provide improved means for lubricating the friction faces of such clutches.

To this end I provide a connection or passage through which lubricant from a stationary bearing is supplied to a part of the clutch so as to get at its friction faces and, preferably, so as to lubricate the bearings of the clutch at the same time.

By way of example I shall describe my invention as applied to an automatic machine tool which is equipped with a threading appliance. In machines of this kind as heretofore constructed suitable means for reliable lubrication of the friction clutch for reversing the rotation of the driven shaft have not been available. A double-conical clutch member is carried on the shaft so as to be displaced thereon but held against rotation with respect to the shaft, and is alternately connected with one out of a pair of pulleys rotating in opposite directions. The pulleys are provided with hollow conical faces for the reception of the movable member and are actuated by belts the driving pulleys of which are usually arranged below the pulleys on the driven shaft.

In all machines of this type the friction faces are lubricated by means of a passage which extends radially from the face of the pulleys and is normally closed by a screw plug. In modern high-output machines it is necessary to renew the lubricant several times per day. This is a rather complicated and tedious operation as it necessitates throwing off the belt from its driving pulley, lifting it from the surface of the clutch pulley, turning the pulley so as to place the plug on top, unscrewing the plug, filling in the lubricant, closing the plug, and replacing the belt, care being taken to prevent oil getting at the belt.

Obviously this operation is not only complicated and tedious but also involves heavy loss of time, as the machine must be arrested while it is being performed, and the danger of soiling the belt is always present notwithstanding careful manipulation. Leakage of oil through the plug is also possible on account of the high centrifugal action at the speed of the pulley which is about 4000 revolutions per minute. If this happens, not only the belt is soiled, but the lubricant is carried away from the point where it is required so that running dry and damage to the lubricated faces are inevitable.

Another drawback of the old system is that it is often neglected to renew the lubricant on account of the inconvenience connected with this operation.

These drawbacks are overcome in my invention as the supply of the lubricant from a stationary bearing or from the lubricant supplying means of the bearing by any approved means such as automatic lubricators, distributors and the like does not involve any difficulties.

In reducing my invention to practice I provide a lubricant chamber in connection with a stationary bearing or bearings and an overflow leading from this chamber and supplying lubricant to the bearing of the pulley or pulleys. From this bearing the lubricant passes through another overflow to the faces of the friction clutch. The first overflow is spaced farther from the axis of the stationary bearing than the inner bearing face, and the second overflow is spaced still farther from the axis, so that the lubricant will flow from the stationary bearing across the rotary (pulley) bearing to the operative face of the rotary clutch member under the action of gravity.

In the drawing accompaying this specification and forming part thereof, a lubricating device embodying my invention is illustrated diagrammatically by way of example in section along the axis of the friction clutches.

Referring now to the drawings, 1 is a spindle, 2 is a bearing block and 3 and 4 are bearings at the ends of the block for supporting the spindle 1. The bearings 3 and 4 are equipped with brasses 5 and 8, and lubricating rings 6 and 9, respectively, the brasses being slotted for the reception of the rings. 7 is a distance sleeve on the spindle 1 by which the spindle is mounted to rotate in the brass 5. The brass 8 bears directly on the spindle.

The brasses are held in position by nuts 10, 11 and 12, 13 which abut against opposite faces of the bearings 3 and 4, respectively.

14 is a distance sleeve which is keyed on the spindle 1, 15 is a shoulder on the spindle near the bearing 4, and 16 and 17 are ball bearings adapted to absorb thrust, which are held in position by the sleeves 7 and 14 and the shoulder 15. 20 is a thrust washer which abuts against the outer end of the sleeve 7, and 21 is a nut on the threaded end 22 of the spindle 1 which exerts thrust on the outer end of the sleeve 7 through the medium of the washer 20, so as to hold assembled the parts on the spindle.

Splined on the sleeve 14 is a clutching member 23 which is reciprocated through the medium of a ring 24 from a suitable lever, not shown. 25 and 26 are tapering clutching faces at the ends of the member 23, and 27 and 28 are tapering seats in the pulleys 18 and 19 for the reception of the clutching faces. The clutching member 23 is displaced on the sleeve 14 so as to connect the pulley 18 or the pulley 19 with the spindle. By these means the spindle 1 is rotated in one direction when connected with the pulley 18 and in the opposite direction when connected with the pulley 19.

Lubricant is supplied to the oil chambers 31 and 32 of the bearings 3 and 4, respectively, through pipes 29 and 30, respectively. 33 and 34 are passages in the lower faces of the brasses 5 and 8, respectively, which convey oil from the oil-wells 31 and 32 to the ball bearings 16 and 17 of the adjacent pulleys 18 and 19.

Considering first the bearing 3, the oil from the passage 33 tends to flow uniformly to either side of the brass 5, but at the outer end of the bearing the flow is arrested by the thrust washer 20 and the clearance 37 at the end of the nut 10 which is so small as to prevent escape of oil. The washer 20 is supplied with just the amount of oil it requires but the bulk of the oil flows toward the inner end of the bearing where a wide passage 35 is provided between a tubular flange at the outer end of the nut 11 and the sleeve 7, so that the oil is conducted toward the ball bearing 16 and finally creeps to the cooperating faces 25 and 27 at the pulley 18 after lubricating the ball bearing 16.

41 is an inwardly projecting flange on the pulley 18 at the end of the ball bearing which faces the clutching member 23, the inside diameter of which flange is much larger than the outside diameter of the sleeve 14. 39 is an annular nut which is inserted in the pulley 18 at the end which is opposite the flange 41 and surrounds the tubular flange of the passage 35 in the nut 11 at a slight clearance which is much smaller than the passage at the flange 41, so that the oil flows toward the faces 25 and 27 under centrifugal action, and has no tendency to leak through the small clearance at the annular nut 39.

The oil passages are so determined that only a small quantity of oil is permitted to flow in them, for the quantity of lubricant required for the ball bearing 16 and the faces 25 and 27 is small, only a skin of oil forming on such faces. The oil is made up by the flow from the pipe 29.

The lubricating system for the ball bearing 17, the pulley 19 and the faces 26 and 28 of the pulley and the clutching member 23 is designed on quite similar lines with a passage 36 in an annular flange of the nut 12 and an inwardly projecting flange 42 in the pulley 19, but in this instance the passage 34 in the brass 8 only extends toward the passage 36 and not to either side as does the passage 33 of the brass 5, because the bearing 4 is without the thrust washer 20 of the bearing 3 and therefore lubrication is not required at the outer end of the bearing. 38 is a clearance in the nut 13 for the spindle 1 which corresponds to the clearance 37 at the nut 10, and 40 is an annular nut in the pulley 19 which corresponds to the annular nut 39 of the pulley 18. The lubrication of the ball bearing 17 and the faces 26 and 28 at the clutching member 23 and the pulley 19, respectively, is effected from the oil well 32 and made up from the pipe 30, exactly as described with reference to the lubrication of the ball bearing 16. Oil is supplied to the pipes 29 and 30 in small quantities, normally drops, and there is no continuous flow of oil in the passages. The oil flows from the bearings of the spindle at 3 and 4 toward the ball bearings 16 and 17 under the action of gravity and to the clutching faces under centrifugal action.

It will appear that the first and second overflows referred to in the introduction for conducting lubricant from either of the bearings 3 and 4 which may be termed stationary bearings, to the adjacent roller or rotary bearings 16 and 17, are stepped in the manner of a cascade.

In this manner instead of the usual means by which only periodic lubrication of the bearings is permitted with considerable difficulties and loss of time, and only while the machine is inactive, means are provided for automatically lubricating the friction surfaces from a stationary supply without arresting the machine, the lubrication of these faces preferably including the lubrication of the pulley bearings.

I wish it to be understood that I do not desire to be limited to the exact details of construction shown and described for obvious modifications will occur to a person skilled in the art.

I claim:

1. A friction clutch comprising a shaft, two cooperating clutch members on said shaft, a stationary bearing for said shaft, a lubricant chamber near the bottom of said stationary bearing, a rotary bearing for the other clutch member and an overflow connecting said lubricant chamber with said rotary bearing.

2. A friction clutch comprising a shaft, two cooperating clutch members on said shaft, a stationary bearing for said shaft, a lubricant chamber near the bottom of said stationary bearing, a rotary bearing for the other clutch member, an overflow connecting said lubricant chamber with said rotary bearing, and another overflow connecting the bottom portion of said rotary bearing with the operative face of said other clutch member.

3. A friction clutch comprising a shaft, a stationary bearing supporting said shaft, a clutch member splined on said shaft, a bearing surrounding said shaft for rotation relative thereto, another clutch member supported by said rotary bearing, a lubricant chamber near the bottom of said stationary bearing, and an overflow connecting said chamber with said rotary bearing.

4. A friction clutch comprising a shaft, a stationary bearing supporting said shaft, a clutch member splined on said shaft, a bearing surrounding said shaft for rotation relative thereto, another clutch member supported by said rotary bearing, a lubricant chamber near the bottom of said stationary bearing, an overflow connecting said chamber with said rotary bearing, and another overflow connecting the bottom portion of said rotary bearing with the operative face of said other clutch member.

5. A friction clutch comprising a shaft, two cooperating clutch members on said shaft, a stationary bearing for said shaft, a lubricant chamber near the bottom of said stationary bearing, a rotary bearing for the other clutch member and an overflow connecting said lubricant chamber with said rotary bearing, said overflow being spaced farther from the axis of said stationary bearing than the inner face of said bearing.

6. A friction clutch comprising a shaft, two cooperating clutch members on said shaft, a stationary bearing for said shaft, a lubricant chamber near the bottom of said stationary bearing, a rotary bearing for the other clutch member, an overflow connecting said lubricant chamber with said rotary bearing and another overflow connecting the bottom portion of said rotary bearing with the operative face of said other clutch member, said first overflow being spaced farther from the axis of said stationary bearing than the inner face of said bearing, and said other overflow being spaced still farther apart from said axis than said first overflow.

7. A friction clutch comprising a shaft, stationary bearings in which said shaft is supported, a clutch member adapted to be displaced on and to partake in the rotation of said shaft, clutch members on said shaft adapted to rotate independently thereof in opposite direction and to be alternately engaged by said displaceable part, and cascade-like stepped means for conducting lubricant from said stationary bearings to the bearings and to the friction faces of said oppositely rotating members.

In testimony whereof I affix my signature.

KARL TESSKY.